Patented Dec. 8, 1936

2,063,685

UNITED STATES PATENT OFFICE 2,063,685

ABRASIVE WHEEL

Merton B. Lane, Holden, Mass., assignor to Norton Company, Worcester, Mass., a corporation of Massachusetts No Drawing. Application November 11, 1935, Serial No. 49,252

6 Claims. (Cl. 51—280)

The invention relates to abrasive bodies and with regard to its more specific features to abrasive wheels including grinding wheels.

One object of the invention is to provide a rubber bonded wheel of superior strength and toughness. Another object of the invention is to provide a bond of the rubber type which shall tenaciously adhere to the abrasive grain. Another object of the invention is to provide a rubber bonded wheel that has non-glazing qualities. Another object of the invention is to provide a rubber bonded wheel of desired heat resistance qualities. Other objects of the invention include the manufacture of other abrasive bodies, such as abrasive blocks, regulating wheels and the like having the desirable characteristics above mentioned and others. Other objects will be in part obvious or in part pointed out hereinafter.

The invention accordingly consists in the features of construction, combinations of elements, arrangements of parts, and in the several steps and relation and order of each of said steps to one or more of the others thereof, all as will be illustratively described herein, and the scope of the application of which will be indicated in the following claims.

I provide a suitable quantity of abrasive grain. Within the scope of the invention any type of abrasive grain may be used, and any size thereof. For example, the invention may be carried out with any one of the varieties of aluminum oxide grain, silicon carbide grain, diamonds, quartz, garnet, and also other hard carbides may be used such as boron carbide, tungsten carbide, tantalum carbide and the like. Any of the natural grains may also be used, the commonest being emery and corundum.

What grain sizes are employed will depend upon the particular type of grinding or abrading to be done or the particular characteristics of the wheel desired. For example, for a regulating wheel for centerless grinding, a fine grit size of grain, e. g. 80 mesh, of aluminum oxide may be employed. For snagging wheels I may employ aluminum oxide grain of the grit size 12 or thereabouts. For stone-cutting wheels I may use silicon carbide grain of the mesh size 24–30.

I provide a quantity of rubber in the ordinary sheet form. This may be smoked sheets, or crepe or ball rubber. Any form or condition of the natural rubber may be used.

With the rubber I mix a desired quantity of sulphur in order to vulcanize the product to a hard rubber. For example, I may use anywhere between 20% and 50%, by weight, of sulphur. This percentage of sulphur is the percentage of the total quantity of sulphur, rubber, and the substance added thereto to be hereinafter described.

In the past it has been the practice to mix abrasive grains with rubber by milling the rubber and introducing the grain into the rubber in an internal mixer. I may introduce the desired quantity of abrasive grain into the rubber in this manner and either before, after, or at the same time I add the further ingredient now to be specified. Considering now the further ingredient, if phenol-sulphonic acid is added to rubber on the mill, there is produced after baking a reaction product which is hard and brittle, like balata, and which has very great adhesive properties. This product has been designated by the trade name "Thermoprene". Its properties include the property of softening at about 150° F.

I introduce the desired quantity of "Thermoprene" into the rubber bond as aforesaid. One manner of carrying out the method involves breaking the sheets of Thermoprene into small particles and introducing it into the rubber on the mill. I prefer to introduce the Thermoprene into the rubber in the mixer after some of the abrasive grains have been introduced as the abrasive grains have the effect of assisting in breaking it up.

The amount of Thermoprene used will depend upon the ultimate results desired. Hard vulcanized rubber in a grinding wheel having approximately 32% of combined sulphur softens around 212° F., that is the boiling point of water at thirty inches of mercury. Under similar conditions Thermoprene softens at 150° F. I may make a wheel having a bond including a desired amount of sulphur for vulcanization and the remainder one-half Thermoprene and one-half rubber. Between the limits of 150° F. and 212° F. the softening point of a Thermoprene rubber mixture depends upon the proportions of the two substances, and while the curve is not a straight line it is fairly close thereto. Therefore, I make the mixture according to the temperature at which I wish the wheel to soften. In some cases I may wish the wheel to soften at 150° F. and may use Thermoprene and sulphur but no rubber.

In the latter event, that is using all Thermoprene and sulphur for the bond, I soften the Thermoprene in an oven before putting it in the mixer. In this way I can introduce the abrasive grains into it effectively. In so much as Thermoprene is naturally a hard horny substance, I may omit sulphur altogether. In that event, and also in certain other cases, I may use heated rolls for milling the mix, and when the mix is milled to a sheet of the desired thickness I die out the wheels which set hard by cooling.

The quantity of abrasive grains used will depend entirely upon the desired characteristics of the wheel and is governed by former practice. Therefore, the wheel or other abrasive body of the invention may be made incorporating abrasive grain percentages within any of the limits heretofore practiced.

When using a mixture of Thermoprene, rubber and sulphur, or when using a mixture of Thermoprene and sulphur, I vulcanize the wheel in an oven according to prior practice. Furthermore, known methods of dieing out the required shapes and working the rubber on the mill may be practiced.

One of the outstanding properties of Thermoprene is its high adhesive characteristics, and thereby the abrasive grain is gripped tenaciously. Furthermore, the degree of hardness of the wheel as a whole is increased by the use of this substance. A grinding wheel which is very heat resistant and of not sufficient hardness will glaze and ultimately spall. By the addition of Thermoprene which reduces the softening point, spalling tendencies are eliminated as before a particular grain is completely worn down and rendered useless the bond has softened enough to allow it to come out without spalling off a large quantity of the wheel. At all events a superior wheel may be made for certain purposes, such as snagging, by introducing into the bond a substance which increases the grade hardness of the wheel, at the same time lowering its heat resistant qualities. For different uses a different softening temperature is desired, and accordingly for the entire range of temperatures hereinbefore specified, wheels may be made which have the desired characteristics for particular uses.

Another manner of compounding a wheel which I may practice involves the dissolving of the Thermoprene in any rubber solvent, such as benzol, then coating the abrasive grains with the solution. I may practice this method where I desire a wheel in which the abrasive grains are tenaciously held in place. The low heat resistance characteristics will also be present in such a wheel depending upon the amount of Thermoprene used.

It will thus be seen that there has been provided by this invention a method, an article and a composition in which the various objects hereinabove set forth together with many thoroughly practical advantages are successfully achieved. As various possible embodiments might be made of the mechanical features of the above invention and as the art herein described might be varied in various parts, all without departing from the scope of the invention, it is to be understood that all matter hereinbefore set forth is to be interpreted as illustrative and not in a limiting sense.

I claim:

1. Method of making a grinding wheel or other abrasive body which comprises providing a quantity of abrasive grain, mixing the abrasive grain with rubber and Thermoprene, heating the mixture, dieing out the required shape while the mixture is hot, and allowing the shape to harden by cooling.

2. Method of making a grinding wheel or other abrasive body which comprises taking a quantity of abrasive grain, mixing the abrasive grain with rubber and Thermoprene, heating during mixing, forming a required shape from the mixture, and allowing to cool.

3. Method of making a rubber bonded grinding wheel of low heat resistant quality which comprises taking a quantity of abrasive grain, a quantity of rubber, a quantity of sulphur, and adding thereto a quantity of Thermoprene, mixing the ingredients together, forming the desired shape, and vulcanizing.

4. Method of making a grinding wheel or other abrasive body which comprises taking a quantity of abrasive grain, dissolving a quantity of Thermoprene in a rubber solvent, coating the abrasive grains with the solution, adding rubber and sulphur, forming a desired shape, and vulcanizing.

5. As a new article of manufacture, an abrasive body comprising abrasive grains bonded with rubber and Thermoprene.

6. As a new article of manufacture, a grinding wheel or other abrasive body comprising abrasive grains bonded with a hard vulcanized mixture of rubber and Thermoprene.

MERTON B. LANE.